(12) United States Patent  
Ablabutyan

(10) Patent No.: US 9,205,771 B2
(45) Date of Patent: Dec. 8, 2015

(54) FOLDING ASSISTING ARM ASSEMBLY FOR LIFT GATES

(75) Inventor: Karapet Ablabutyan, Glendale, CA (US)

(73) Assignee: Maxon Industries, Inc., Santa Fe Springs, CA (US)

(*) Notice: Subject to any disclaimer, the term of this patent is extended or adjusted under 35 U.S.C. 154(b) by 73 days.

(21) Appl. No.: 14/001,485

(22) PCT Filed: Feb. 23, 2012

(86) PCT No.: PCT/US2012/026366
§ 371 (c)(1),
(2), (4) Date: Aug. 23, 2013

(87) PCT Pub. No.: WO2012/116211
PCT Pub. Date: Aug. 30, 2012

(65) Prior Publication Data
US 2014/0003897 A1    Jan. 2, 2014

Related U.S. Application Data

(60) Provisional application No. 61/446,923, filed on Feb. 25, 2011.

(51) Int. Cl.
*B60P 1/00*    (2006.01)
*B60P 1/44*    (2006.01)

(52) U.S. Cl.
CPC ............. *B60P 1/4492* (2013.01); *B60P 1/4414* (2013.01); *B60P 1/4471* (2013.01)

(58) Field of Classification Search
CPC ............ B60P 1/40; B60P 1/42; B60P 1/4415; B60P 1/445

USPC .......................................... 414/546, 556, 557
See application file for complete search history.

(56) References Cited

U.S. PATENT DOCUMENTS

| 3,737,055 A | 6/1973 | Pettit | |
|---|---|---|---|
| 6,705,825 B2* | 3/2004 | Kreutinger | 414/557 |
| 2005/0191161 A1* | 9/2005 | Ablabutyan et al. | 414/557 |
| 2006/0245885 A1* | 11/2006 | Ablabutyan et al. | 414/556 |
| 2008/0063499 A1* | 3/2008 | Niinisto | 414/557 |

FOREIGN PATENT DOCUMENTS

CA         2435120 A1    1/2004

OTHER PUBLICATIONS

International Preliminary Report on Patentability mailed Sep. 6, 2013 for International Application No. PCT/US2012/026366 from the International Bureau of WIPO, pp. 1-6, Geneva, Switzerland.

(Continued)

*Primary Examiner* — Saul Rodriguez
*Assistant Examiner* — Emery Hassan
(74) *Attorney, Agent, or Firm* — Brooks Acordia IP Law, P.C.; Michael Zarrabian

(57) ABSTRACT

The present invention provides folding assisting arm assembly for lift gates. In one embodiment, the folding assisting arm assembly comprises a folding assisting apparatus for a lift gate having a platform with a foldable section. The apparatus comprises an elongated arm, and a pivot axle, wherein a proximal end of the elongated arm is pivotably mounted on the pivot axle. The apparatus further comprises a spring for spring loading the elongated arm. When the folding assisting apparatus is mounted on the lift gate proximate the platform, a biasing tension in the spring urges a distal end of the elongated arm on the foldable section of the lift platform during a portion of movement of the lift platform to maintain the foldable section folded.

26 Claims, 12 Drawing Sheets

(56) References Cited

OTHER PUBLICATIONS

International Search Report and the Written Opinion mailed May 30, 2012 for International Application No. PCT/US2012/026366 from the International Searching Authority and United States Commissioner for Patents, 13 pages, Alexandria, Virginia, United States.

Canadian Office Action dated Aug. 14, 2014 for Canadian Patent Application No. 2,827,332 from Canadian Intellectual Property Office, pp. 1-2, Gatineau, Quebec, Canada.

* cited by examiner

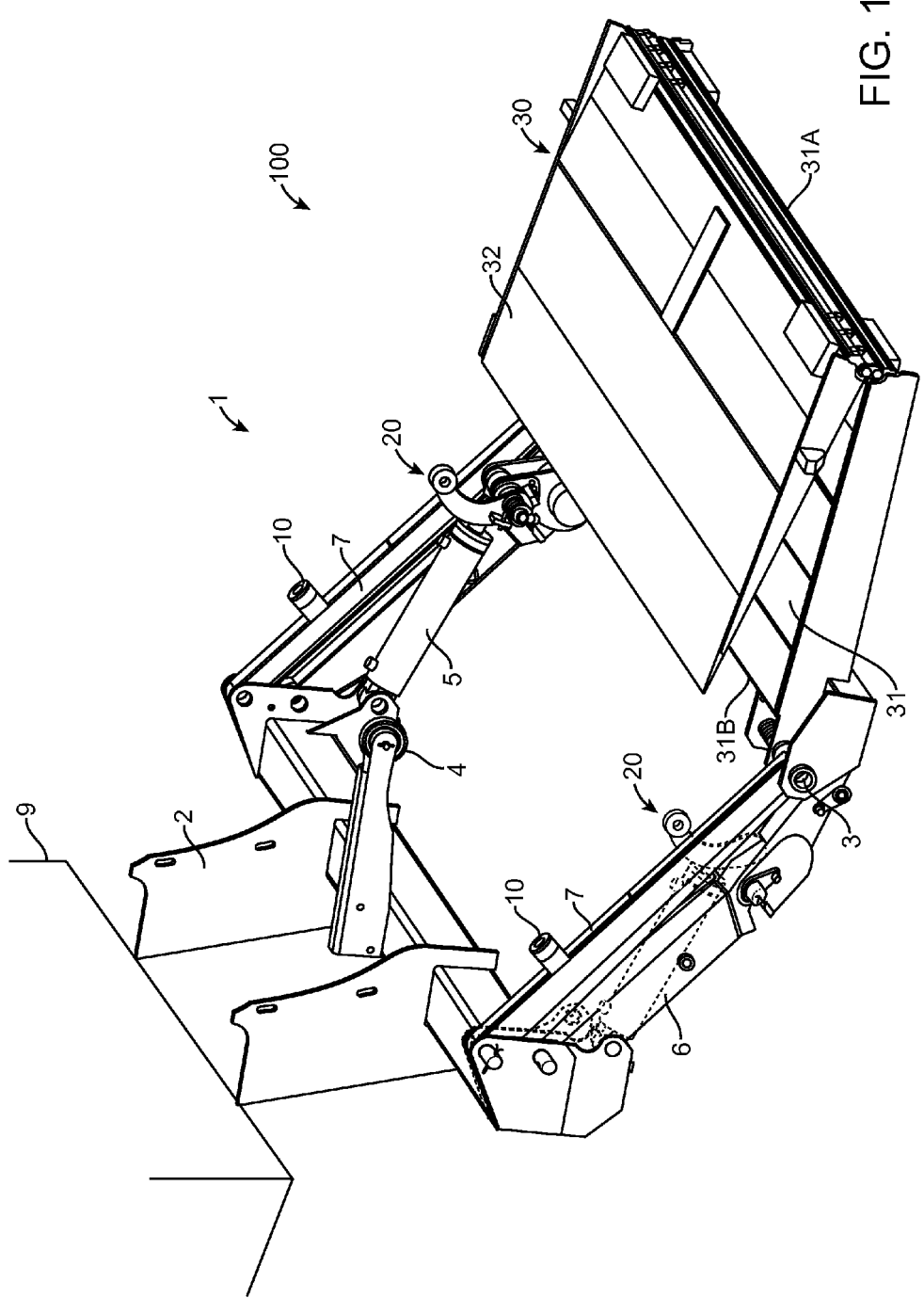

FOLDING ASSISTING ARM ASSEMBLY FOR LIFT GATES

CROSS REFERENCE TO RELATED APPLICATIONS

This application is the U.S. National Phase Patent Application under 35 U.S.C. §371 of International Application Number PCT/US2012/026366, filed on Feb. 23, 2012, which claims priority to U.S. Provisional Patent Application Ser. No. 61/446,923 filed Feb. 25, 2011. Both applications, International Application Number PCT/US2012/026366 and U.S. Provisional Patent Application Ser. No. 61/446,923, are incorporated herein by reference in their entirety.

BACKGROUND OF THE INVENTION

1. Field of the Invention

The present invention relates generally to lift gates, and in particular, to a folding assisting arm kit for lift gates.

2. Description of Related Art

Lifts such as lift gates are typically mounted at a structure such as an opening at the rear of a vehicle to lift payloads on a lift platform from one level (e.g., ground level) up to another level (e.g., the bed of the vehicle), or vice versa.

One type of lift gate employs parallelogram linkages to maintain a lift platform in a horizontal plane through the lifting range. The lift platform is attached to the linkages by pivot members, which allow the lift platform to be pivoted. Operation of the lifting mechanism may also rotate the lift platform into an inverted, stowed position beneath the vehicle body. Actuators, such as hydraulic actuators and electric actuators, are used to provide lifting force for moving the lift platform.

BRIEF SUMMARY OF THE INVENTION

The present invention relates to folding assisting arm assembly for lift gates. In one embodiment, the folding assisting arm assembly comprises a folding assisting apparatus for a lift gate having a platform with a foldable section. The apparatus comprises an elongated arm, and a pivot axle wherein a proximal end of the elongated arm is pivotably mounted on the pivot axle. The apparatus further comprises a spring for spring loading the elongated arm. When the folding assisting apparatus is mounted on the lift gate proximate said platform, a biasing tension in the spring urges a distal end of the elongated arm on the foldable section of the lift platform during a portion of movement of the lift platform to maintain the foldable section folded.

These and other features, aspects and advantages of the present invention will become understood with reference to the following description, appended claims and accompanying figures.

BRIEF DESCRIPTION OF THE DRAWINGS

FIG. 1 shows a perspective view of a lift gate system, according to an embodiment of the present invention.

DETAILED DESCRIPTION OF THE INVENTION

Figure 2A:
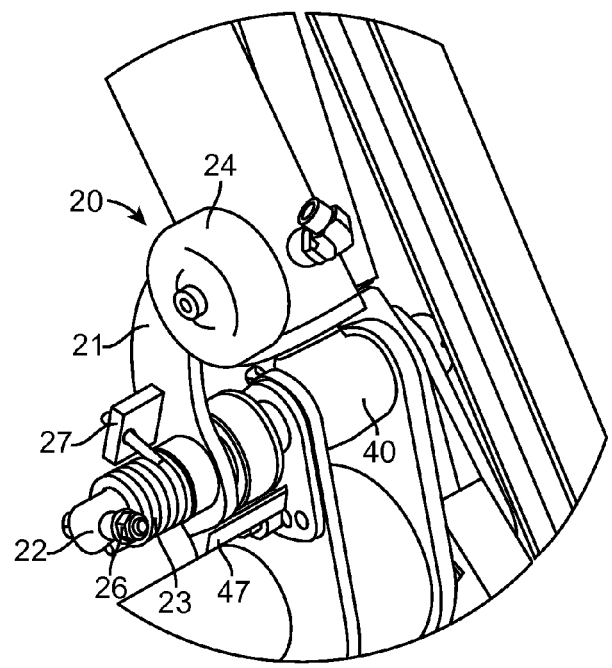
FIG. 2A shows a front perspective view of the folding assisting arm assembly detachably attached to a lift gate, according to an embodiment of the present invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments of the invention provide a folding assisting arm assembly (apparatus) for lift gates. In one embodiment, the folding assisting arm assembly comprises a folding assisting apparatus for a lift gate having a platform with a foldable section. The apparatus comprises an elongated arm, and a pivot axle wherein a proximal end of the elongated arm is pivotably mounted on the pivot axle. The apparatus further comprises a spring for spring loading the elongated arm. When the folding assisting apparatus is mounted on the lift gate proximate said platform, a biasing tension in the spring urges a distal end of the elongated arm on the foldable section of the lift platform during a portion of movement of the lift platform to maintain the foldable section folded.

In one embodiment, the folding assisting apparatus is mounted on the lift gate proximate said platform by attaching said pivot axle to a lift gate element that supports said platform, such that the folding assisting apparatus moves with said lift platform as the lift platform is rotated into a stowing position and the elongated arm is urged against the foldable section of the lift platform to maintain the foldable section folded as the lift platform is rotated into and/or out of a stowing position.

In one embodiment, a biasing tension in the spring urges the elongated arm on the foldable section of the lift platform during a portion of rotation of the lift platform into and/or out of a stowing position, to maintain the foldable section folded. In one embodiment, the spring comprises a compression spring coil disposed concentric with the pivot axle for spring loading the elongated arm.

In one embodiment, a force on the elongated arm by said foldable section of the lift platform rotates the elongated arm about said pivot axle against the biasing tension in the spring as the lift platform is rotated.

In one embodiment, the foldable section of the lift platform is pivotably coupled to a proximal end of a platform section of the lift platform, and the biasing tension in the compression spring continually urges the foldable section onto the platform section during said portion of rotation of the lift platform.

In one embodiment, the folding assisting arm apparatus further comprises a roller rotatably coupled to said distal end of the elongated arm such that the roller comes into contact with the foldable section of the lift platform during said portion of rotation of the lift platform.

In one embodiment, the folding assisting arm apparatus further comprises a first protrusion on the pivot axle to maintain a first end of the compression spring to limit the rotational range of the elongated arm about the pivot axle in a first direction. The folding assisting arm apparatus further comprises a second protrusion on the elongated arm to maintain a second end of the compression spring to limit the rotational range of the elongated arm in a second, opposite, direction.

In one embodiment, the folding assisting arm apparatus is detachably coupled to the lift gate via at least one bolt, wherein the elongated arm is substantially curved.

Exemplary embodiments of the invention are described in conjunction with the drawings. Referring to FIG. 1, in one embodiment of the present invention provides a lift gate system 100 comprising a lift gate 1 and a folding assisting arm assembly comprising at least one folding assisting arm apparatus 20. The lift gate 1 is mounted to a rear frame 2 of a vehicle body 9. The lift gate 1 in this example is a stow away type; however embodiments of the invention are useful with other types of lift gates as well.

The load-carrying surfaces of the lift gate 1 comprise a lift platform 30 comprising a platform section 31 and a foldable section ("flipover") 32 that is pivotally coupled to a proximal end 31A of the platform section 31. The flipover 32 is folded onto the platform section 31 during stowing of the lift gate 1.

In one embodiment, the lifting mechanism of the lift gate 1 comprises a pair of hydraulic cylinders 5, a first pair of parallelogram linkage arms 6, and a second pair of parallelogram linkage arms 7. The pair of hydraulic cylinders 5 actuates the raising, lowering and stowing for the lift gate 1. The linkages 6 and 7 support the lift platform 30 as the lift gate 1 is raised, lowered or stowed. The linkages 6 and 7 maintain the lift platform 30 in a substantially horizontal plane relative to ground, as the lift platform 30 is raised/lowered.

A distal end (31B) of the platform section (31) of the lift platform (30) is pivotably mounted for rotation on at least one pivot point (30). During stowing of the lift gate 1, the linkages 6 and 7 and hydraulic cylinders 5 rotate the lift platform 30 about at least one pivot point 3 towards the frame 2. As the lift platform 30 rotates about the pivot point 3, due to action of gravity the flipover 32 naturally tends to unfold and swing open towards the frame 2 (and towards linkages 6,7, and hydraulic cylinders 5). To prevent such unfolding of the flipover 32, and to maintain the flipover 32 folded onto the platform section 31 during said rotation of the lift platform 30, a first folding assisting arm apparatus 20 and a second folding assisting arm apparatus 20 are detachably coupled to the lift gate 1, according to an embodiment of the invention. Each folding assisting arm apparatus 20 prevent unfolding of the flipover 32 during a portion of said rotation of the platform 30 by urging the flipover 32 against platform section 31 of the lift platform 30 (e.g., FIG. 6).

Figure 2B:
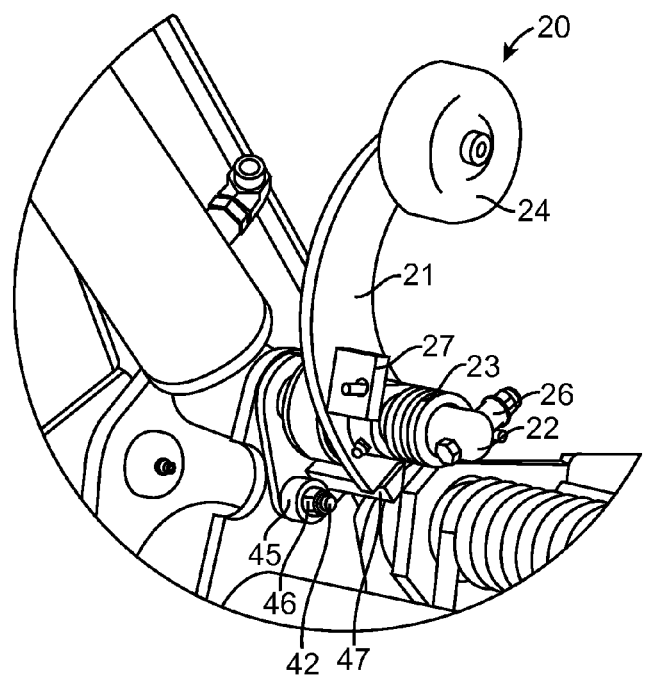
FIG. 2B shows a back perspective view of the folding assisting arm assembly and method of detachably attaching to a lift gate, according to an embodiment of the present invention.
Figure 2C:
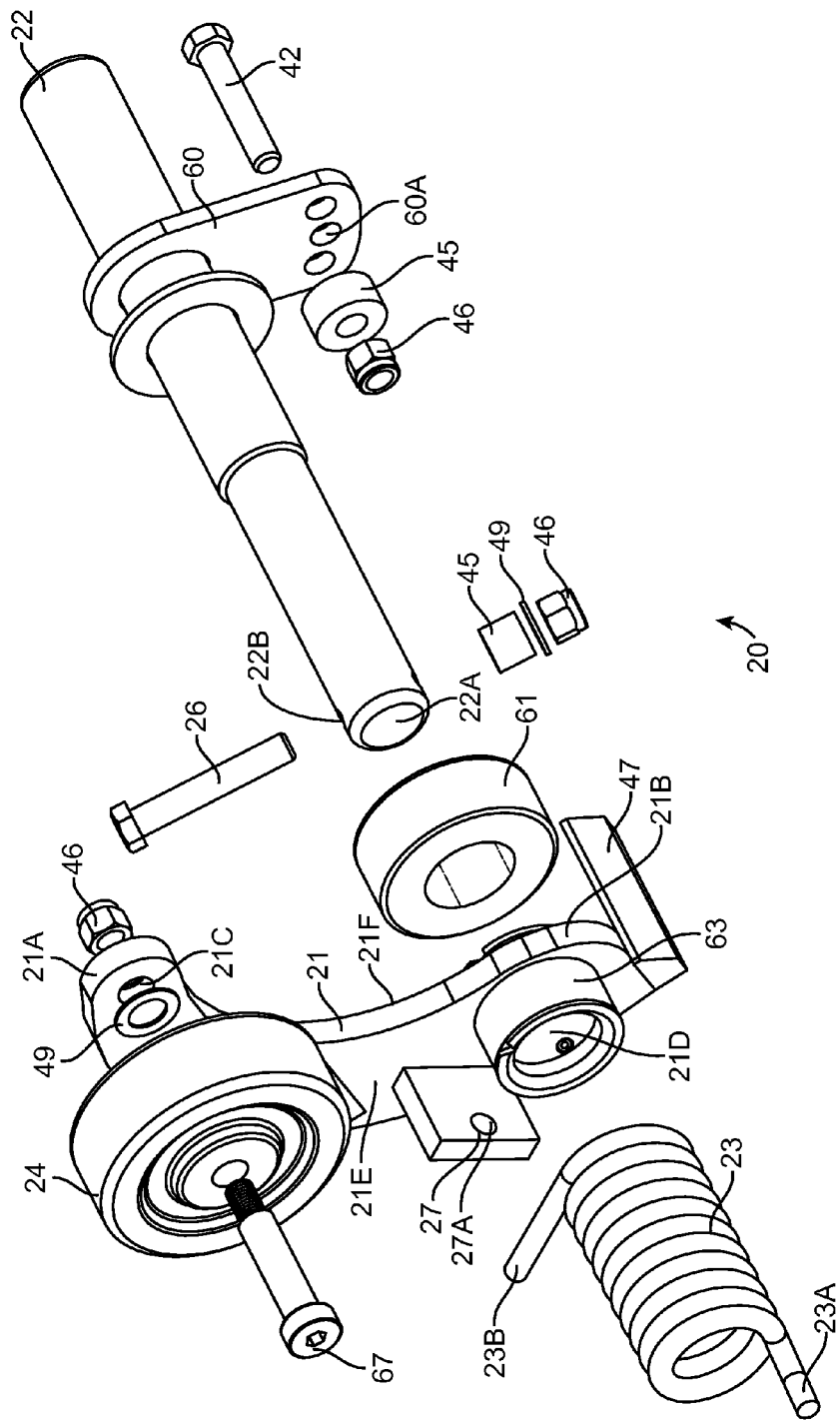
FIG. 2C shows an exploded back perspective view of the folding assisting arm assembly and method of detachably attaching, according to an embodiment of the present invention.

FIG. 2A is a front perspective view of a folding assisting arm apparatus 20, shown as detachably attached to the lift gate 1, according to an embodiment of the present invention. FIG. 2B shows a rear perspective view of the folding assisting arm apparatus 20 as attached to the lift gate 1. FIG. 2C shows an exploded back perspective view of the folding assisting arm apparatus 20, according to an embodiment of the present invention. In one embodiment, each folding assisting arm apparatus 20 comprises a generally elongated member 21, which one example comprises a curved arm. The assembly 30 further comprises, a pivot axle 22 on which a first end of the curved arm 21 is pivotably mounted for rotation. The apparatus 20 further comprises a compression spring coil 23 disposed concentric with the axle 22. The spring coil 23 exerts a biasing force on the arm 21 such that the arm 21 is spring-loaded towards the lift platform 30 (FIG. 1).

The apparatus 20 further comprises a roller 24 coupled to a second end of the arm 21, opposing said first end of the arm 21. The roller 24 comes in contact with the flipover 32 during a portion of the rotation of the lift platform 30 (e.g., FIG. 6).

As shown in FIGS. 2A-2B, one end of the spring 23 is fixedly attached to a protrusion 26 on the axle 22. A second end of the spring 23 is fixedly attached to a protrusion 27 on the arm 21 to bias the arm 21 towards the platform 30. The spring 23 so positioned and attached to the protrusions 26 and 27, governs the rotational range of the arm 21 in the clockwise and counterclockwise directions, respectively.

In one embodiment, the apparatus 20 is detachably attached to a specified location on the lift gate 1 using attachment mechanisms such as bolts, snaps, etc. This allows the apparatus 20 to be detached from the lift gate 1 when needed. Further, this allows the apparatus 20 to be replaced quickly (no cutting or welding), as desired. In embodiment, the apparatus 20 is detachably attached to an end 40 of the hydraulic cylinder 5 on the linkage arms 7 of the lift gate 1, as shown.

To detachably attach the apparatus 20 to the lift gate 1, in one example the axle 22 of the apparatus 20 is inserted through a rod end 40 of the hydraulic cylinder 5 of the lift gate 1. An operator then rotates the arm 21 of the apparatus 20 about the axle 22, against the biasing force of the spring coil 23, to a desired orientation (angle) in relation to the protrusion 26 on the axle 22 and in relation to the platform 30. While holding tension on the arm 21, the operator uses a stopper (e.g. bolts, snaps, etc.) to maintain said desired orientation of the arm 21. For example, a bolt 42 is used as a stopper to maintain said desired orientation. The bolt 42 is fastened using a steel collar 45 and a nut 46. A steel cross arm 47 on the arm 21 of the apparatus 20 rests upon the front aspect of the steel collar 45 after the bolt 42 is fastened to the lift gate 1 to maintain said desire orientation of the arm 21 (FIG. 6A).

As shown in FIG. 2C, the arm 21 is pivotably mounted for rotation on the axle 22. An end 21B of the arm 21 includes an aperture 21D extending from a side 21E to an opposing side 21F of the arm 21. The aperture 21D is shaped to receive the axle 22. A bearing 63 and a roller 61 support the arm 21 and the axle 22 as the arm 21 pivots on the axle 22.

The spring coil 23 is disposed concentric with the axle 22. The first protrusion 26 disposed at an end 22A of the axle 22 fixes an end 23A of the spring coil 23. The end 22A of the axle 22 includes an aperture 22B extending transversely through the end 22A of the axle 22. The aperture 22B is shaped for receiving the first protrusion 26. In one embodiment, the first protrusion 26 is a fastener 26 (e.g., a bolt, a screw) that is inserted through the aperture 22B. The fastener 26 may be secured to the axle 22 using a steel collar 45, a nut 46, and a washer 49.

The second protrusion 27 on the arm 21 fixes a left end 23B of the spring coil 23. In one embodiment, the second protrusion 27 is a flange 27 extending from the side 21E of the arm 21. The flange 27 includes an aperture 27A shaped to receive the left end 23B of the spring coil 23.

The roller 24 is coupled to an opposing end 21A of the arm 21. The end 21A of the arm 21 includes an aperture 21C shaped to receive a fastener 67 (e.g., a bolt, a screw) that couples the roller 24 to the end 21A of the arm 21. The fastener 67 may be secured to the end 21A of the arm 21 using a washer 49 and a nut 46.

The kit 20 further includes a fastening plate 60 and at least one fastener 42 (e.g., a bolt, a screw) for detachably attaching the kit 20 to the lift gate 1. The fastening plate 20 includes at least one aperture 60A shaped to received the fastener 42 (e.g., a bolt). The fastener 42 and the fastening plate 60 are secured to the lift gate 1 using a steel collar 45 and a nut 46.

Figure 3B:
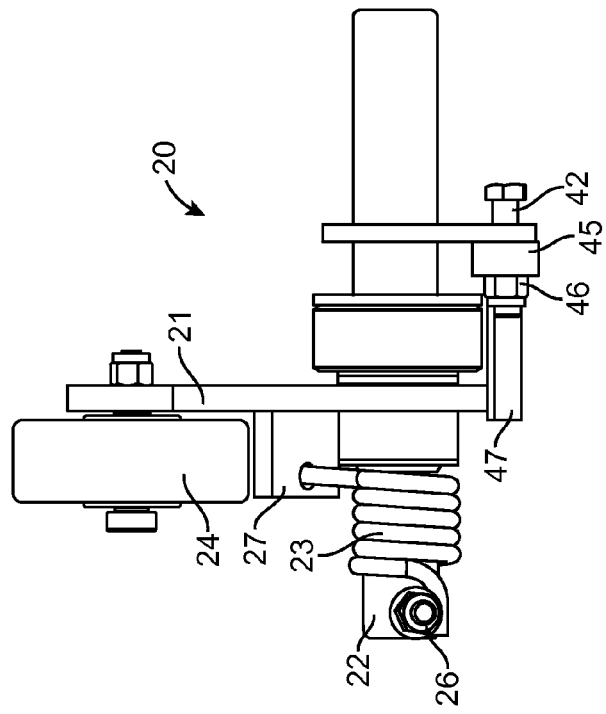
FIG. 3B shows a bottom view of the folding assisting arm assembly, according to an embodiment of the present invention.
Figure 3A:
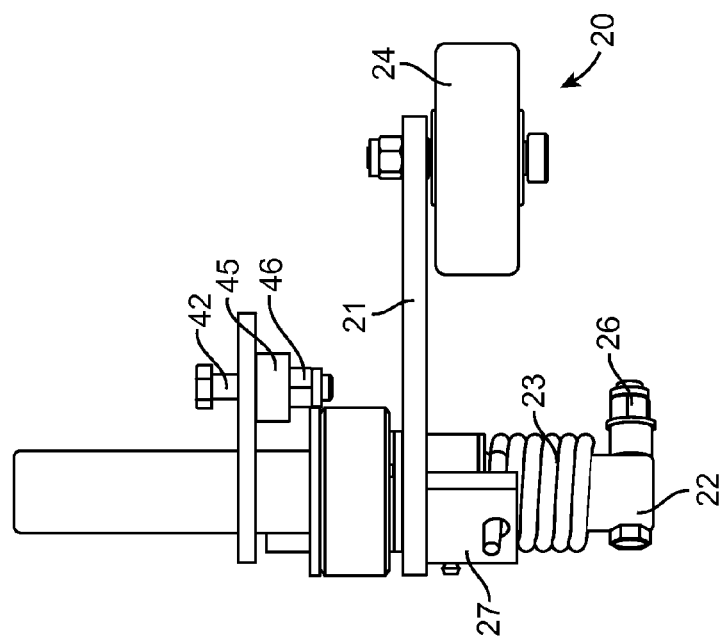
FIG. 3A shows a top view of the folding assisting arm assembly, according to an embodiment of the present invention.

FIG. 3A shows a top view of a folding assisting arm apparatus 20, wherein the arm 21 rotates clockwise/counterclockwise about the axle 22. FIG. 3B shows a bottom view of the folding assisting arm apparatus 20. The apparatus 20 is inserted through the rod end 40 (FIG. 2A) of the lift gate 1 in a manner that positions an end of the spring coil 23 behind the first protrusion 26, as illustrated.

Figure 4:
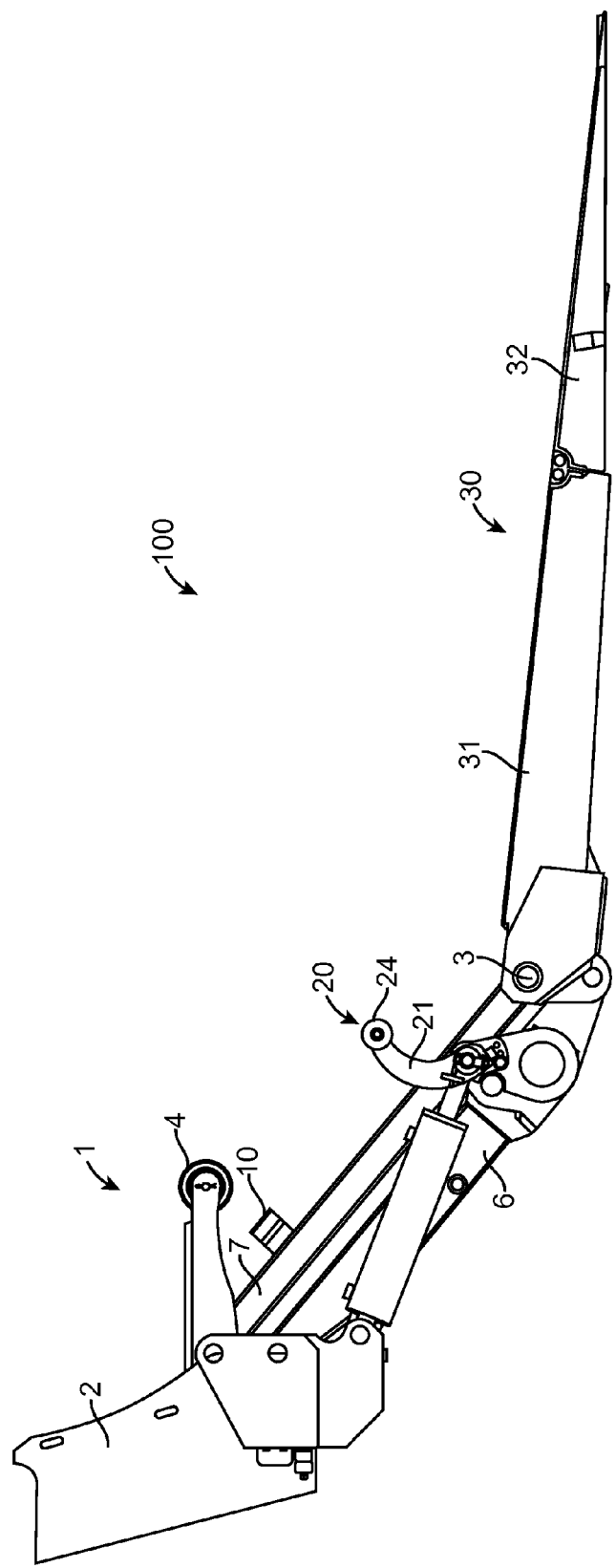
FIG. 4 shows a side view of the lift gate system and the folding assisting arm assembly with an unfolded lift platform, according to an embodiment of the invention.

FIGS. 4-13 show a method of operation of the lift gate system 100, according to an embodiment of the invention. FIG. 4 shows a side view of a lift gate system 100, according to an embodiment of the invention, wherein the lift platform 30 is lowered and substantially horizontal relative to ground. In this example, the flipover 32 is unfolded. The flipover 32 is in the unfolded position during lifting operations, such as shown in FIG. 4. To stow the platform 30 underneath the vehicle body 9 (as shown FIG. 13), an operator first removes any load from the lift platform 30 and manually folds the flipover 32 over the platform section 31. In one example the flipover 32 is hinged to the platform section 31, allowing the flipover 32 to be folded over onto the platform section 31.

Figure 5:
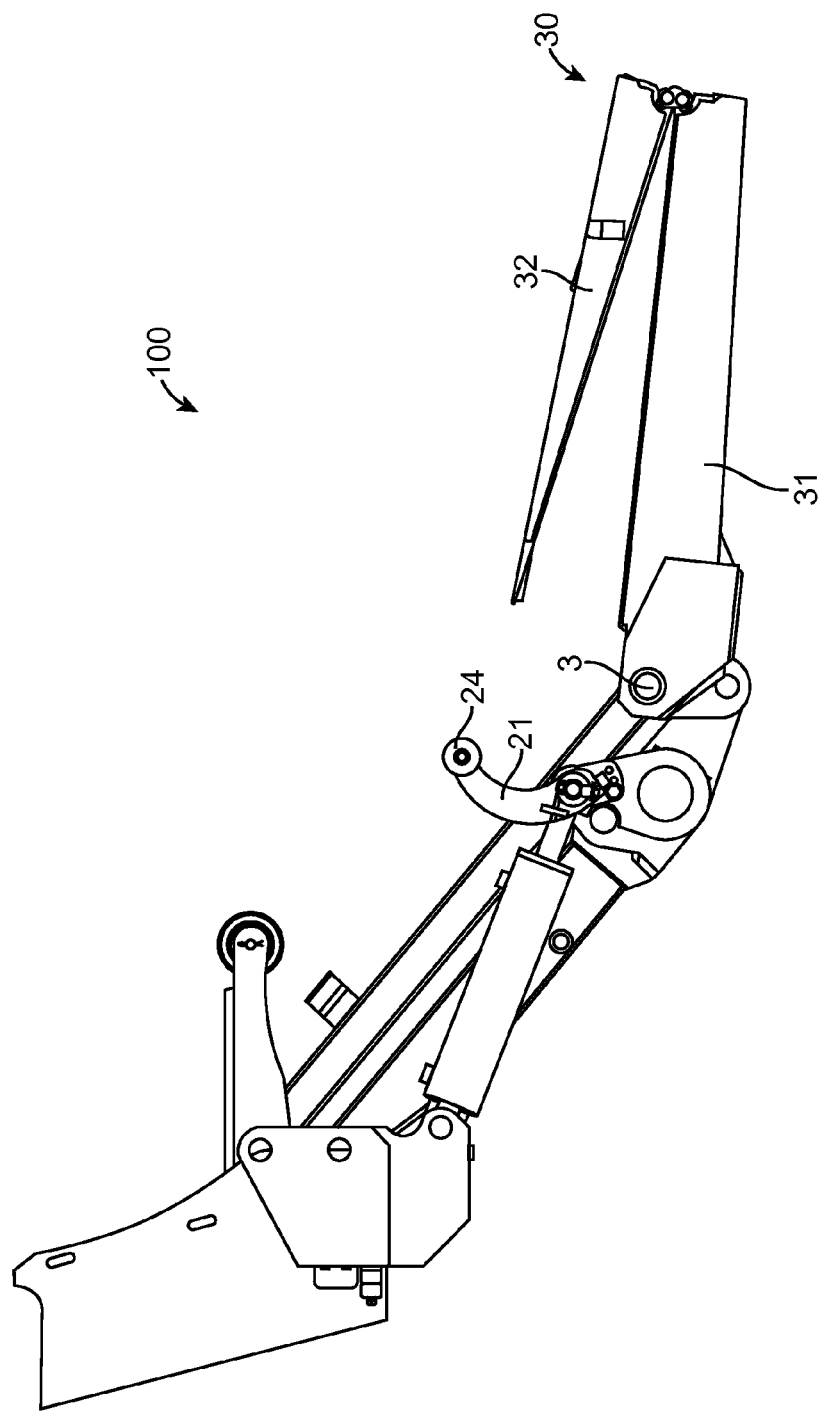
FIG. 5 shows a side view of the lift gate system and the folding assisting arm assembly with a folded lift platform, according to an embodiment of the invention.

FIG. 5 shows a side view of the lift gate system 100, wherein the flipover 32 is folded over the platform section 31. In this example, the lift gate 1 is ready for stowing. The operator pushes a switch to initiate stowing of the lift gate 1 as shown in FIGS. 6-13.

FIGS. 6-13 illustrate a stowing sequence for the lift gate 1, showing an example of the range of motion of the linkages 6 and 7, the arm 21 of the apparatus 20, and the lift platform 30 during stowing of the lift gate 1, according to an embodiment of the invention.

Figure 6:
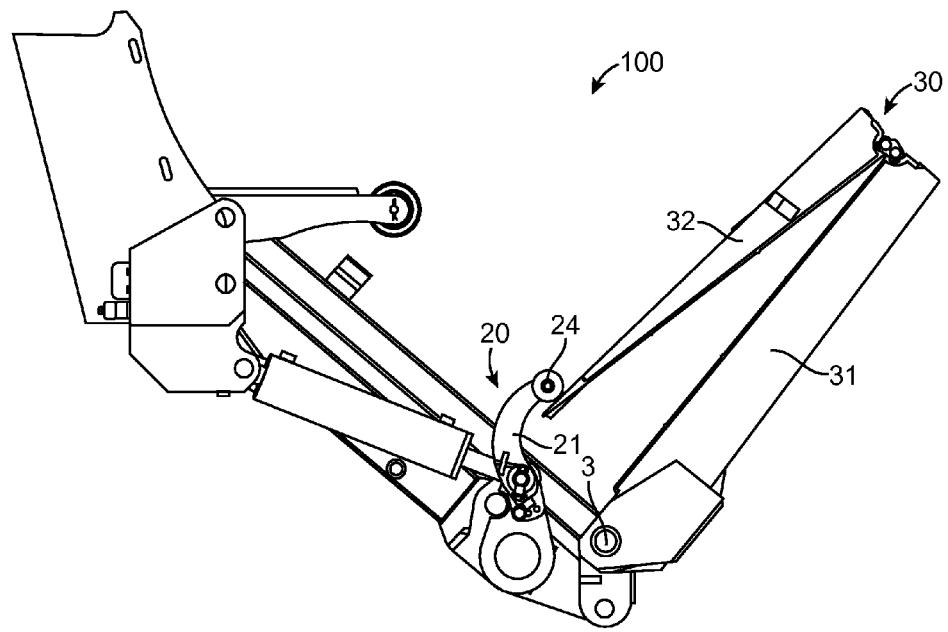
FIG. 6 shows a side view of the lift gate system and the folding assisting arm assembly in a sequence of stowing, according to an embodiment of the invention.
Figure 6A:
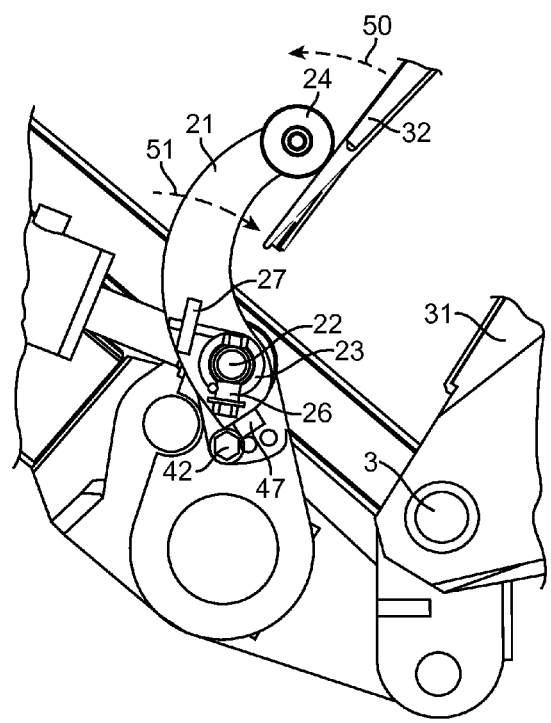
FIG. 6A shows an exploded side view of the lift gate system and the folding assisting arm assembly in a sequence of stowing, according to an embodiment of the invention.

Specifically, FIG. 6 shows a side view of the lift gate system 100, wherein the folded lift platform 30 is pivoted about pivot point 3 by the action of the actuators 5 (FIG. 1) on the linkages 6 (FIG. 1) and 7 (FIG. 1) to rotate the platform 30 towards the frame 2 (FIG. 1). As the folded platform 30 rotates about the pivot point 3, gravity causes the flipover 32 to tend to swing open (unfold) and away from the platform section 31.

As shown in FIG. 6, as the flipover 32 tends to swing open, the roller 24 of the arm 21 comes into contact with underside of a tip portion of the flipover 32 as the lift platform 30 rotates. The force resulting from the flipover 32 tend to swing open causes the arm 21 to rotate about the pivot axle 22 (FIG. 2C) against a biasing tension in the spring coil 23 (FIG. 2C) as the platform 30 rotates. However, the spring loaded arm 21 prevents the flipover 32 from swinging open, wherein the spring loaded arm 21 urges the flipover 32 against the platform section 31 and maintains the flipover 32 folded during remainder of rotation of the platform 30.

To maintain the flipover 32 folded onto the platform section 31, the biasing tension in the spring coil 23 exerts a force via the arm 21 upon the flipover 32. The biasing tension in the spring coil 23 causes the arm 21 to continually urge the flipover 32 onto the platform section 31 as the lift platform 30 rotates as shown in FIGS. 6-13. The biasing tension in the spring coil 23 provides sufficient pressure to maintain the flipover 32 folded onto the platform section 31 as the lift platform 30 rotates.

The biasing tension in the spring coil 23 is selected such that the arm 21 remains urged against the flipover 32 while allowing the arm 21 to gradually recline (pivot) on the axle 22 due to the weight of the lift platform 30 bearing on the arm 21 as the lift platform 30 rotates counterclockwise.

FIG. 6A shows a detailed view of the folding assisting arm apparatus 20 of FIG. 6, wherein arrow 50 indicates direction of a force resulting from tendency of the flipover 32 to swing open due to gravity when the folded platform 30 approaches (and goes past) the vertical in its rotation. The arrow 51 indicates direction of an opposing force by the arm 21 due to the biasing tension in the spring coil 23, continually urging the flipover 32 onto the platform section 31.

The force 50 causes the arm 21 to rotate (recline) about the axle 22 against the biasing tension in the spring coil 23. The biasing tension in the spring coil 23, in turn, causes the arm 21 to continually urge the flipover 32 onto the platform section 31 essentially along the force 51.

Figure 7:
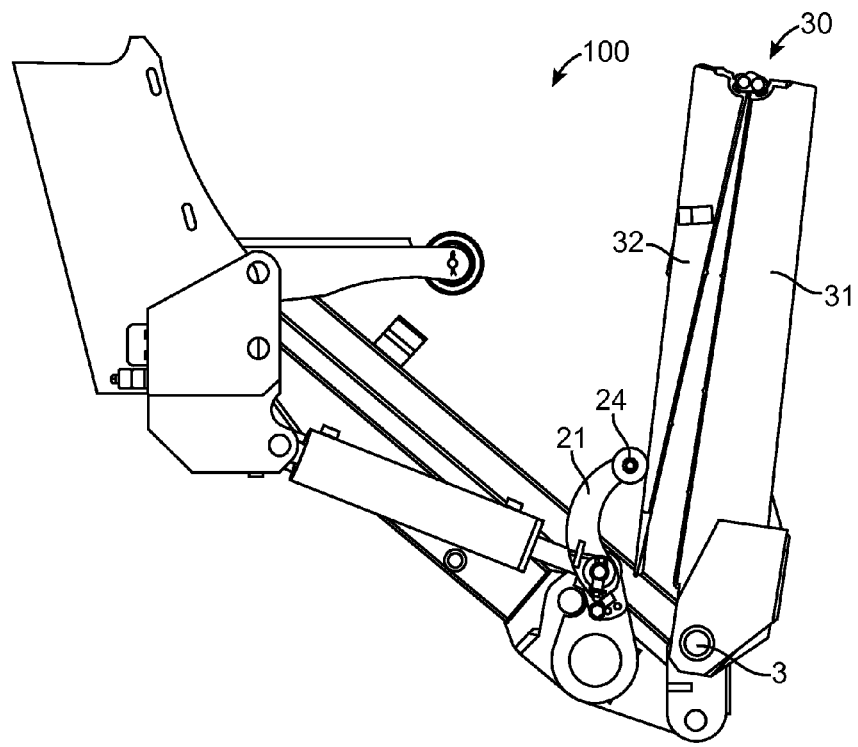
FIG. 7 shows a side view of the lift gate system and the folding assisting arm assembly in a sequence of stowing, according to an embodiment of the invention.

FIG. 7 shows a side view of the lift gate system 100, wherein the folded lift platform 30 rotates about the pivot point 3 to an almost vertical (upright) position relative to ground. As shown in FIG. 7 relative to FIG. 6, the spring-loaded arm 21 has reclined further about the axle 22 to bear the weight of the folded lift platform 30 as the lift platform 30 rotates. As the arm 21 reclines further about the axle 22, the roller 24 also travels down on the underside of the flipover 32, away from the tip portion of the flipover 32 towards section 31.

Figure 8:
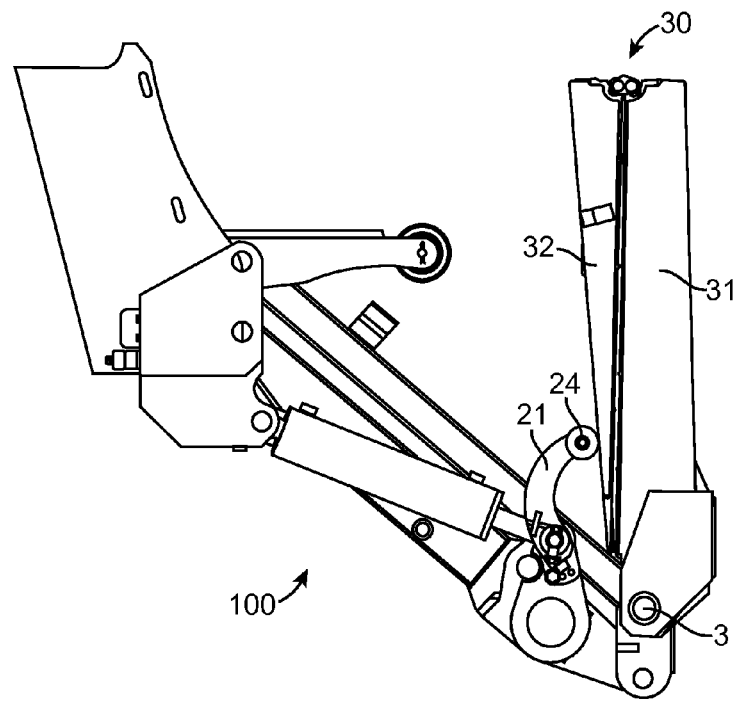
FIG. 8 shows a side view of the lift gate system and the folding assisting arm assembly in a sequence of stowing, according to an embodiment of the invention.

FIG. 8 shows a side view of the lift gate system 100, wherein the lift platform 30 is rotated about pivot point 3 to an upright position. As shown, the gap between the flipover 32 and the platform section 31 is reduced by the urging action of the spring loaded arm 21 against underside of the flipover section 32. The biasing tension in the spring coil 23 provides sufficient pressure to keep the flipover 32 folded onto the platform section 31 (the biasing tension of the coil 23 is selected such that the arm 21 maintains the flipover section 32 urged towards the platform section 31). The reduction of the gap between the flipover 32 and the platform section 31 causes the roller 24 to ride further away from the tip of the flipover 32.

Figure 11:
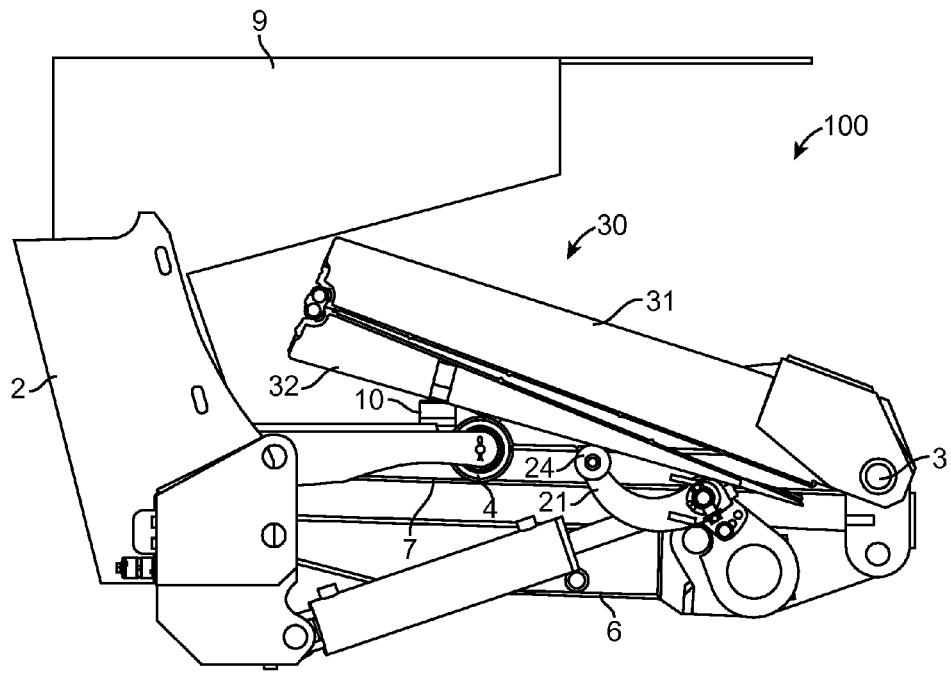
FIG. 11 shows a side view of the lift gate system and the folding assisting arm assembly in a sequence of stowing, according to an embodiment of the invention.

The arm 21 continues to recline further back (rotate) as it bears the weight of the rotating lift platform 30 past the upright position and towards the linkages 6 and 7. As noted, the biasing tension in the spring coil 23 is selected to account for the weight of the lift platform 30 and said resulting force 50 during rotation of the platform 30, thereby allowing the arm 21 to gradually recline while maintaining the flipover 32 folded onto the platform section 31. This process continues until the folded lift platform 30 is rotated to come to a rest upon a platform stopper 10 of the lift gate 1 (FIG. 11).

Figure 9:
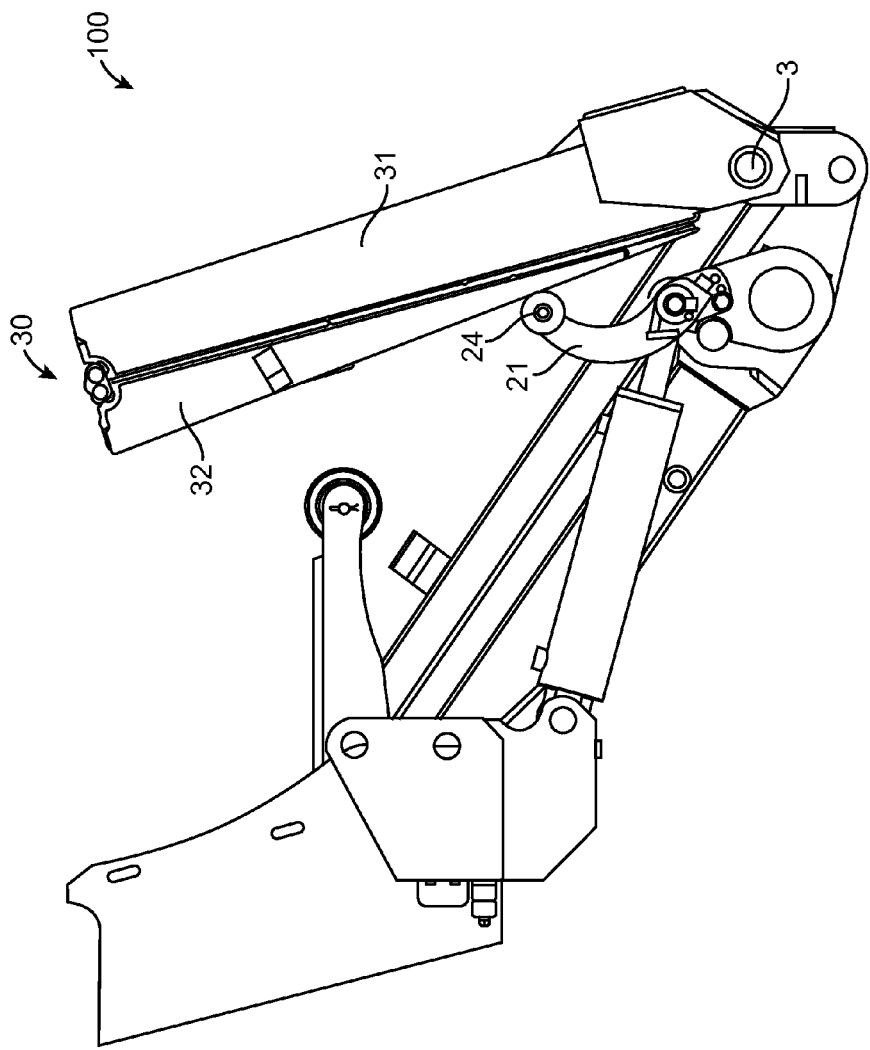
FIG. 9 shows a side view of the lift gate system and the folding assisting arm assembly in a sequence of stowing, according to an embodiment of the invention.

FIG. 9 shows a side view of the lift gate system 100, wherein the lift gate 1 is further along in the sequence of stowing the folded platform 30. As shown, the arm 21 has reclined further back about the axle 22 (FIG. 6A) due to the force 50 (FIG. 6A) as it bears the weight of the rotating lift platform 30, while the force 51 (FIG. 6A) due to action of the spring loaded arm 21 maintains the flipover 32 folded.

Figure 10:
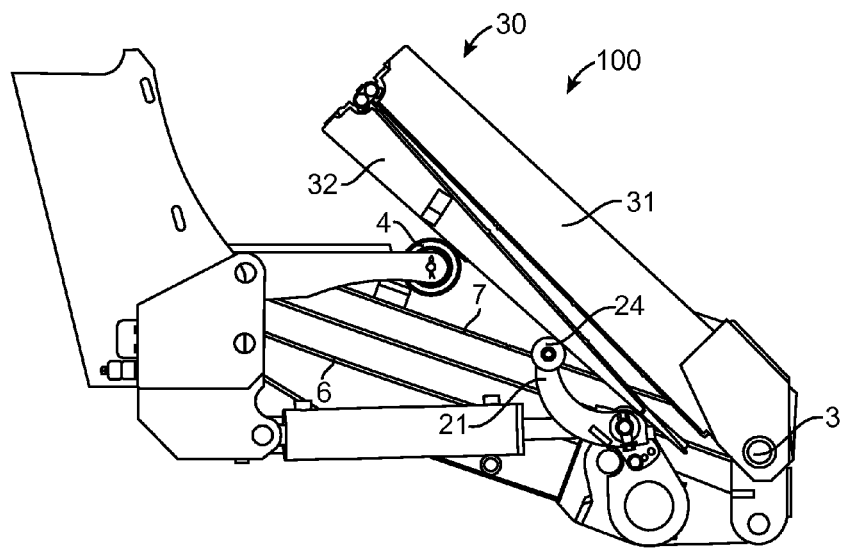
FIG. 10 shows a side view of the lift gate system and the folding assisting arm assembly in a sequence of stowing, according to an embodiment of the invention.

FIG. 10 shows a side view of the lift gate system 100, wherein the rotating flipover 32 comes into contact with a support roller 4 of the lift gate 1. The support roller 4 rides down underside the flipover 32 until the lift platform 30 is resting against the platform stopper 10 (FIG. 11). The support roller 4 is in fixed relationship relative to the frame 2. Both the arm 21 of the apparatus 20 and the platform stopper 10 then maintain the flipover 32 folded onto the platform section 31 when the lift gate 1 is stowed.

Figure 10A:
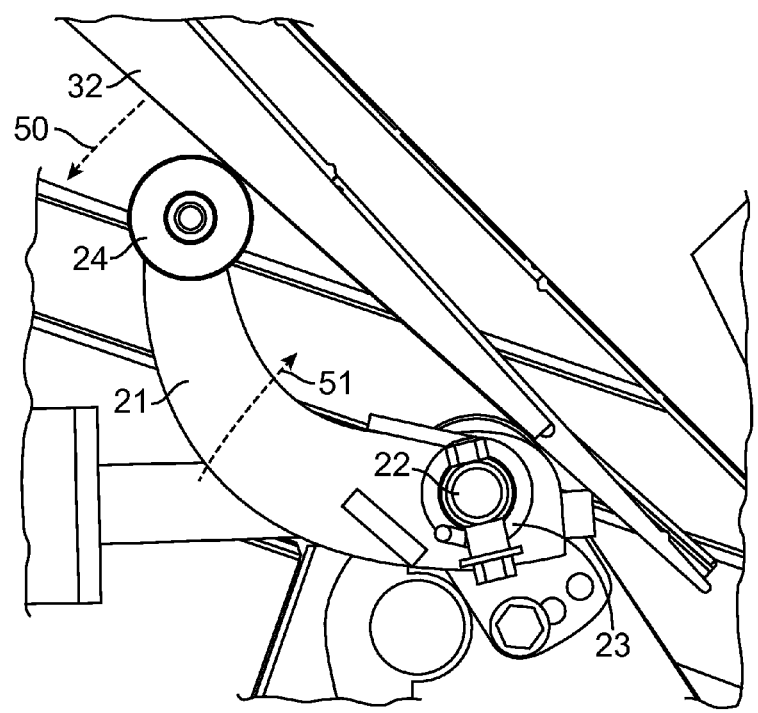
FIG. 10A shows an exploded side view of the lift gate system and the folding assisting arm assembly in a sequence of stowing, according to an embodiment of the invention.

FIG. 10A shows a detailed view of the folding assisting arm apparatus 20 (FIG. 6) in FIG. 10. The arm 21 has reclined further back against the biasing tension of the spring coil 23 in response to the force 50 resulting from the weight of the flipover 32. The biasing tension in the spring coil 23 in turn causes the arm 21 to continually urge the flipover 32 onto the platform section 31 by the force 51. The arm 21 continues to recline further back until the lift platform 30 is rotated to come to a rest on the stationary platform stopper 10, as shown in FIG. 11.

FIG. 11 shows a side view of the lift gate system 100, wherein the lift gate 1 is approaching the final sequence of stowing. As shown in FIG. 11, the linkages 6 and 7 are substantially horizontal relative to ground, bringing the flipover 32 in contact with both the support roller 4 and the platform stopper 10. Arm 21 has reclined even further back to bear the weight of the lift platform 30 as it rotates for stowing.

Figure 12:
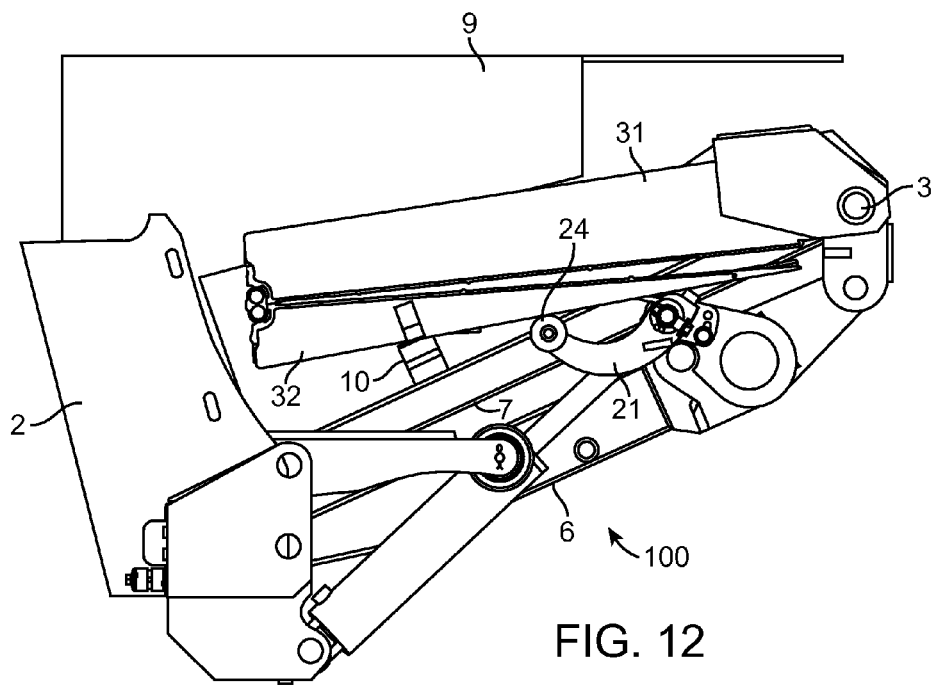
FIG. 12 shows a side view of the lift gate system and the folding assisting arm assembly in a sequence of stowing, according to an embodiment of the invention.

FIG. 12 shows a side view of the lift gate system 100, according to an embodiment of the invention, wherein the lift gate 1 is in the final sequence of stowing. As shown in FIG. 12, the linkages 6 and 7 have rotated the lift platform 30 (FIG. 1) into an inverted position. The lift platform 30 is now resting against the platform stopper 10, with the platform stopper 10 maintaining the flipover 32 folded onto the platform section 31. The arm 21 also continues to urge the flipover 32 onto the platform section 31.

Figure 13:
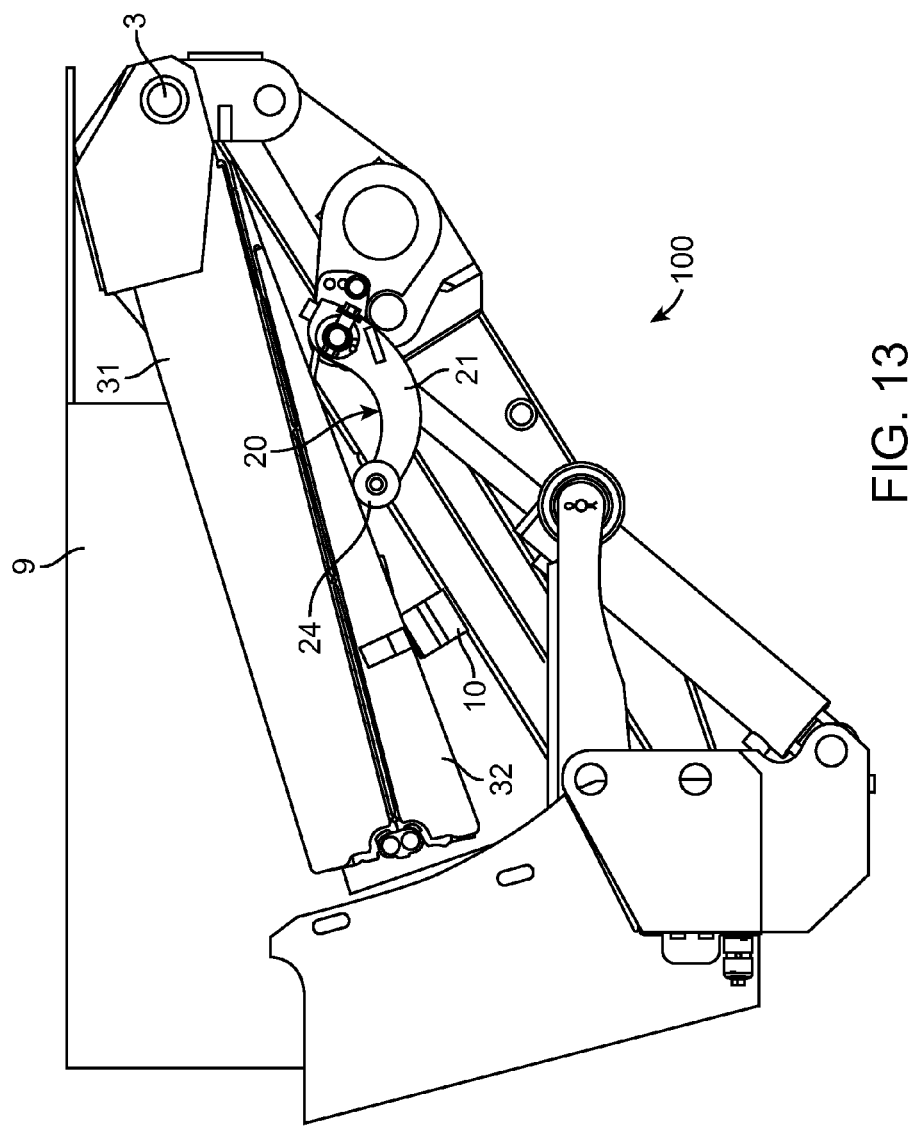
FIG. 13 shows a side view of the lift gate system and the folding assisting arm assembly with a lift gate stowed underneath a vehicle body, according to an embodiment of the invention.

FIG. 13 shows a side view of the lift gate system 100, according to an embodiment of the invention, wherein the lift gate 1 is finally stowed underneath the vehicle body 9. As shown in FIG. 13, the lift platform 30 (FIG. 1) is stowed in an inverted position. The weight of the lift platform 30 is distributed along the platform stopper 10 and the roller 24 attached to the spring-loaded arm 21 of the apparatus 20. Both the platform stopper 10 and the apparatus 20 urge the flipover 32 folded onto the platform section 31 while the lift gate 1 is stowed underneath the vehicle body 9.

The elements of the apparatus 20 may be made of different kinds of metals or non-metal rigid materials.

The present invention has been described in considerable detail with reference to certain preferred versions thereof; however, other versions are possible. Therefore, the spirit and scope of the appended claims should not be limited to the description of the preferred versions contained herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A folding assisting apparatus for a lift gate having a platform coupled to linkages for supporting the platform, the platform having a foldable section, the apparatus comprising:
   an elongated arm;
   a pivot axle, wherein a proximal end of the elongated arm is pivotably mounted on the pivot axle; and
   a spring for spring loading the elongated arm about the pivot axle;
   wherein when the folding assisting apparatus is mounted on the lift gate proximate said platform such that a distal end of the elongated arm remains detached from the platform, a biasing tension in the spring urges a distal end of the elongated arm on the foldable section of the lift platform during a portion of movement of the lift platform, to maintain the foldable section folded;
   wherein the biasing tension in the spring causes the elongated arm to remain urged against the foldable section while allowing the elongated arm to gradually recline by pivoting about the pivot axle and compressing the spring due to the weight of the lift platform bearing on the elongated arm as the lift platform rotates during said portion of movement of the lift platform.

2. The apparatus of claim 1, wherein the folding assisting apparatus is mounted on the lift gate proximate said platform by attaching said pivot axle to a lift gate element that supports said platform, wherein the elongated arm reclines independent of linkages for supporting the lift platform;
   such that the folding assisting apparatus moves with said lift platform as the lift platform is rotated into a stowing position and the elongated arm is urged against the foldable section of the lift platform to maintain the foldable section folded as the lift platform is rotated into and/or out of a stowing position.

3. The apparatus of claim 2, wherein a biasing tension in the spring urges the elongated arm on the foldable section of the lift platform during a portion of rotation of the lift platform into and/or out of a stowing position, to maintain the foldable section folded, wherein the elongated arm is not interlocked with said platform linkages.

4. The apparatus of claim 3, wherein the spring comprises a compression spring coil disposed concentric with the pivot axle for spring loading the elongated arm.

5. The apparatus of claim 4, wherein a force on the elongated arm by said foldable section of the lift platform rotates the elongated arm about said pivot axle against the biasing tension in the spring as the lift platform is rotated.

6. The apparatus of claim 4, wherein:
the foldable section of the lift platform is pivotably coupled to a proximal end of a platform section of the lift platform; and
the biasing tension in the compression spring continually urges the foldable section onto the platform section during said portion of rotation of the lift platform.

7. The apparatus of claim 1, further comprising a roller rotatably coupled to said distal end of the elongated arm such that the roller comes into contact with the foldable section of the lift platform during said portion of rotation of the lift platform.

8. The apparatus of claim 1, further comprising:
a first protrusion on the pivot axle to maintain a first end of the compression spring to limit the rotational range of the elongated arm about the pivot axle in a first direction; and
a second protrusion on the elongated arm to maintain a second end of the compression spring to limit the rotational range of the elongated arm in a second, opposite, direction.

9. The apparatus of claim 1, wherein the apparatus is detachably coupled to the lift-gate via at least one bolt.

10. The apparatus of claim 1, wherein the elongated arm and the pivot axle are made of metal.

11. The apparatus of claim 1, wherein the elongated arm is substantially curved.

12. A lift gate system, comprising:
a lift gate including:
a lift platform including a foldable section; and
a lifting mechanism for supporting and moving the lift platform; and
at least one spring loaded folding assisting apparatus for maintaining the foldable section of the lift platform folded as the lift platform rotates, such that a distal end of the folding assisting apparatus remains detached from the platform, wherein the biasing tension in the spring causes the folding assisting apparatus to remain urged against the foldable section while allowing the folding assisting apparatus to gradually recline and compressing the spring due to the weight of the lift platform bearing on the folding assisting apparatus as the lift platform rotates during a portion of movement of the lift platform.

13. The lift gate system of claim 12, wherein each folding assisting apparatus comprises:
an elongated arm;
a pivot axle, wherein a proximal end of the elongated arm is pivotably mounted on the pivot axle of said apparatus; and
a spring for spring loading the elongated arm of said apparatus;
wherein when said apparatus is mounted on the lift gate proximate said platform, a biasing tension in the spring of said apparatus urges a distal end of the elongated arm of said apparatus on the foldable section of the lift platform during a portion of movement of the lift platform, to maintain the foldable section folded wherein the elongated arm reclines independent of linkages for supporting the lift platform.

14. The lift gate system of claim 13, wherein:
each folding assisting apparatus is mounted on the lift gate proximate said platform by attaching the pivot axle of said apparatus to a lift gate element that supports said platform moves with said lift platform as the lift platform is rotated into a stowing position and the elongated arm of said apparatus is urged against the foldable section of the lift platform to maintain the foldable section folded as the lift platform is rotated into and/or out of a stowing position, wherein the elongated arm is not interlocked with said platform linkages.

15. The lift gate system of claim 14, wherein:
for each folding assisting apparatus: a biasing tension in the spring of said apparatus urges the elongated arm of said apparatus on the foldable section of the lift platform during a portion of rotation of the lift platform into and/or out of a stowing position, to maintain the foldable section folded.

16. The lift gate system of claim 15, wherein:
for each folding assisting apparatus: the spring of said apparatus comprises a compression spring coil disposed concentric with the pivot axle of said apparatus for spring loading the elongated arm of said apparatus.

17. The lift gate system of claim 16, wherein:
for each folding assisting apparatus, a force on the elongated arm of said apparatus by said foldable section of the lift platform rotates the elongated arm of said apparatus about the pivot axle of said apparatus against the biasing tension in the spring of said apparatus as the lift platform is rotated.

18. The lift gate system of claim 16, wherein:
the foldable section of the lift platform is pivotably coupled to a proximal end of a platform section of the lift platform; and
the biasing tension in the compression spring of each apparatus continually urges the foldable section onto the platform section during said portion of rotation of the lift platform.

19. The lift gate system of claim 16, wherein:
for each folding assisting apparatus, said apparatus further comprises:
a first protrusion on the pivot axle of said apparatus to maintain a first end of the compression spring of said apparatus and limit the rotational range of the elongated arm of said apparatus about the pivot axle of said apparatus in a first direction; a second protrusion on the elongated arm of said apparatus to maintain a second end of the compression spring of said apparatus and limit the rotational range of the elongated arm of said apparatus in a second, opposite, direction; and
a roller rotatably coupled to the distal end of the elongated arm of said apparatus, such that the roller comes into contact with the foldable section of the lift platform during said portion of rotation of the lift platform.

20. The lift gate system of claim 16, wherein: for each folding assisting apparatus, said apparatus is detachably coupled to the lift gate via at least one bolt.

21. The lift gate system of claim 16, wherein: for each folding assisting apparatus, the elongated arm of said apparatus and the pivot axle of said apparatus are made of metal.

22. The lift gate system of claim 16, wherein: for each folding assisting apparatus, the elongated arm of said apparatus is substantially curved.

23. The lift gate system of claim 18, wherein the lifting mechanism comprises:
- an actuator for moving the lift platform; a first pair of parallelogram linkages for supporting the lift platform;
- a second pair of parallelogram linkages for supporting the lift platform; and
- at least one pivot point on which a distal end of the platform section of the lift platform is pivotably mounted for rotation.

24. The lift gate system of claim 23, wherein the lift gate further comprises at least one platform stopper for the lift platform to rest upon when the lift gate is stowed, the platform stopper maintaining the foldable section of the lift platform folded onto the platform section of the lift platform.

25. The lift gate system of claim 24, wherein the lift gate further comprises at least one support roller for maintaining the foldable section of the lift platform folded onto the platform section of the lift platform as the lift platform rotates counterclockwise about the pivot point.

26. A method, comprising:
- mounting a folding assisting apparatus to a lift gate having a platform with a foldable section, the apparatus including:
- an elongated arm;
- a pivot axle, wherein a proximal end of the elongated arm is pivotably mounted on the pivot axle; and
- a spring for spring loading the elongated arm;
- wherein mounting the folding assisting apparatus comprises mounting the folding assisting apparatus proximate said platform;
- raising the platform wherein a biasing tension in the spring urges a distal end of the elongated arm on the foldable section of the lift platform during a portion of movement of the lift platform, to maintain the foldable section folded;
- such that a distal end of the elongated arm remains detached from the platform, wherein the biasing tension in the spring causes the elongated arm to remain urged against the foldable section while allowing the elongated arm to gradually recline by pivoting about the pivot axle and compressing the spring due to the weight of the lift platform bearing on the elongated arm as the lift platform rotates during a portion of movement of the lift platform, wherein the elongated arm reclines independent of linkages for supporting the lift platform.

* * * * *